(12) United States Patent
Dehais et al.

(10) Patent No.: US 10,099,161 B2
(45) Date of Patent: Oct. 16, 2018

(54) FILTER FOR PNEUMATIC VALVE

(71) Applicant: Hamilton Sundstrand Corporation, Windsor Locks, CT (US)

(72) Inventors: John M. Dehais, Windsor, CT (US); Matthew Wenner, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 15/405,121

(22) Filed: Jan. 12, 2017

(65) Prior Publication Data

US 2018/0195621 A1     Jul. 12, 2018

(51) Int. Cl.
| | |
|---|---|
| *B01D 29/23* | (2006.01) |
| *F02C 9/18* | (2006.01) |
| *F16K 1/22* | (2006.01) |
| *B23P 6/00* | (2006.01) |
| *B01D 46/52* | (2006.01) |
| *B01D 46/00* | (2006.01) |
| *F16K 31/163* | (2006.01) |

(52) U.S. Cl.
CPC .......... *B01D 29/23* (2013.01); *B01D 46/0002* (2013.01); *B01D 46/521* (2013.01); *B23P 6/00* (2013.01); *F02C 9/18* (2013.01); *F16K 1/221* (2013.01); *F16K 31/1635* (2013.01); *B01D 2265/02* (2013.01); *Y10T 137/8085* (2015.04)

(58) Field of Classification Search
CPC .. F16K 31/1635; F02C 9/18; Y10T 137/8085; B01D 29/23
See application file for complete search history.

(56) References Cited

U.S. PATENT DOCUMENTS

| | | | | | |
|---|---|---|---|---|---|
| 2,050,430 | A | * | 8/1936 | Erickson | G05D 16/2013 137/487.5 |
| 3,115,154 | A | * | 12/1963 | Dillon | G05D 16/0663 137/493.8 |
| 5,472,604 | A | * | 12/1995 | Yang | B01D 29/117 210/409 |
| 8,216,329 | B2 | * | 7/2012 | McAuliffe | B01D 46/0005 251/30.01 |
| 2008/0179235 | A1 | * | 7/2008 | Hacker | B01D 29/21 210/232 |

* cited by examiner

*Primary Examiner* — Atif Chaudry
(74) *Attorney, Agent, or Firm* — Kinney & Lange, P.A.

(57) ABSTRACT

An example embodiment of a filter for a butterfly valve includes an inlet side having an axial inlet port and the first diameter $D_{in}$, a closed outer side having a second diameter $D_2$, and a filter body disposed between the inlet side and the outer side. The filter body has a filter diameter $D_{filter}$ larger than both $D_{in}$ and $D_2$, and includes a cylindrical wall retaining a pleated filter media. A plurality of perforations is formed through a main bore wall to serve as at least one exit for the filter.

17 Claims, 4 Drawing Sheets

FILTER FOR PNEUMATIC VALVE

BACKGROUND

The present disclosure relates generally to pneumatically actuated valves and more specifically to filters for pneumatically actuated valves.

Pneumatically actuated valves rely on actuators to drive a control element disposed in a flow passage. One widely used example is a butterfly valve, due to their high degree of accuracy, precision, and responsiveness. As is known, one or more actuators drive rotation of a shaft which in turn controls the position of a disc in the main passage. Conventional pneumatic actuators for butterfly valves have a piston defining a supply chamber and a servo chamber, while an intermediate chamber is vented to ambient. Such arrangements usually include a linear actuator and optionally a torque motor servo valve for enhancing responsiveness to commands. Since the actuator relies on pressure differentials of the working fluid in the main passage, it is important that any stray particles or contaminants be removed to the highest practicable extent from the sampled stream(s) before entering the actuator chamber(s) and torque motor(s).

Current filters for butterfly valves are typically constructed of wire mesh or sintered metal screens. For these and other pneumatic applications where space is at a premium, mesh or sintered filters are installed into a bore and configured into a cylindrical or tophat style configuration. A flange forming the "brim" of the tophat is spring-loaded to seat the filter and hold it in place.

While generally effective, this configuration can face limits on filtration capacity at the small diameters typical of such applications. Mesh and screen filters also can face effective limits on micron rating based on a desired replacement or maintenance interval. Smaller holes increase the time before the filter is clogged, reducing its effectiveness. Further, when clogged, the mesh and screen filters lift against the spring load holding it in place, allowing particles to completely bypass the filter and enter the actuator and/or torque motor.

SUMMARY

One example embodiment of a valve includes a valve housing including one or more first walls defining at least a main fluid passage with a valve centerline parallel to a longitudinal axis of the main fluid passage, and one or more second walls defining an actuator chamber above the main fluid passage. A shaft extends along a shaft passage connecting the actuator chamber and the main fluid passage. A flow control member is mounted to a first longitudinal end of the shaft extending into the main fluid passage, the flow control member rotatable in the main fluid passage. An actuator assembly is disposed in the actuator chamber, and is adapted to rotate a second end of the shaft to effect rotation of the flow control member in the main fluid passage. The actuator assembly includes at least one actuator unit arranged in the actuator chamber. A filter bore is adapted to receive a filter assembly, between the main fluid passage and the actuator chamber. The filter bore includes an inlet bore portion for receiving and retaining an inlet side of the filter assembly having an axial inlet and first diameter $D_{in}$. The inlet bore portion provides communication between the main fluid passage and an axial inlet port on the inlet side of the filter assembly. A main filter bore portion having a filter diameter $D_{filter}$ larger than $D_{in}$ is disposed outward of the inlet bore portion for receiving and retaining a cylindrical wall of a filter body. The main filter bore portion provides communication between at least one outlet port on a main bore wall and the actuator chamber.

An example embodiment of a filter for a butterfly valve includes an inlet side having an axial inlet port and sized to seal within a first bore having a first diameter $D_{in}$, a second side sized to seal within a second bore having a second diameter $D_2$, and a central portion disposed between the inlet side and the second side. The central portion has a filter diameter $D_{central}$ larger than both $D_{in}$ and $D_2$, and includes a cylindrical wall retaining a pleated filter media. At least one perforation is formed through the cylindrical wall to allow fluid flow therethrough.

An embodiment of a method for maintaining a pneumatic valve includes removing a filter assembly from a filter bore. The filter bore includes an inlet bore portion for receiving and retaining an inlet side of the filter assembly having an axial inlet and first diameter $D_{in}$. The inlet bore portion provides communication between the main fluid passage and an axial inlet port on the inlet side of the filter assembly. A main filter bore portion having a filter diameter $D_{filter}$ larger than $D_{in}$, is disposed outward of the inlet bore portion for receiving and retaining a cylindrical wall or central portion of a filter body. The main filter portion provides communication between at least one outlet port on a main bore wall and the actuator chamber. The method also includes inserting a replacement filter assembly into the filter bore, and the replacement filter assembly includes an inlet side having an axial inlet port and sized to seal within a first bore having a first diameter $D_{in}$, a second side sized to seal within a second bore having a second diameter $D_2$; and a central portion disposed between the inlet side and the second side having a central diameter $D_{central}$ wherein $D_{central}$ is greater than both $D_{in}$ and $D_2$. The central portion includes a cylindrical wall retaining a pleated filter media, and at least one perforation is formed through the cylindrical wall to allow fluid flow therethrough.

DETAILED DESCRIPTION

Filtration of contaminants has recently been a focus area for pneumatic valves. Improved methods of filtration and added capacity will improve both the removal and failure rates of valve assemblies, and will lead to improved performance and reduced downtime.

Figure 1:
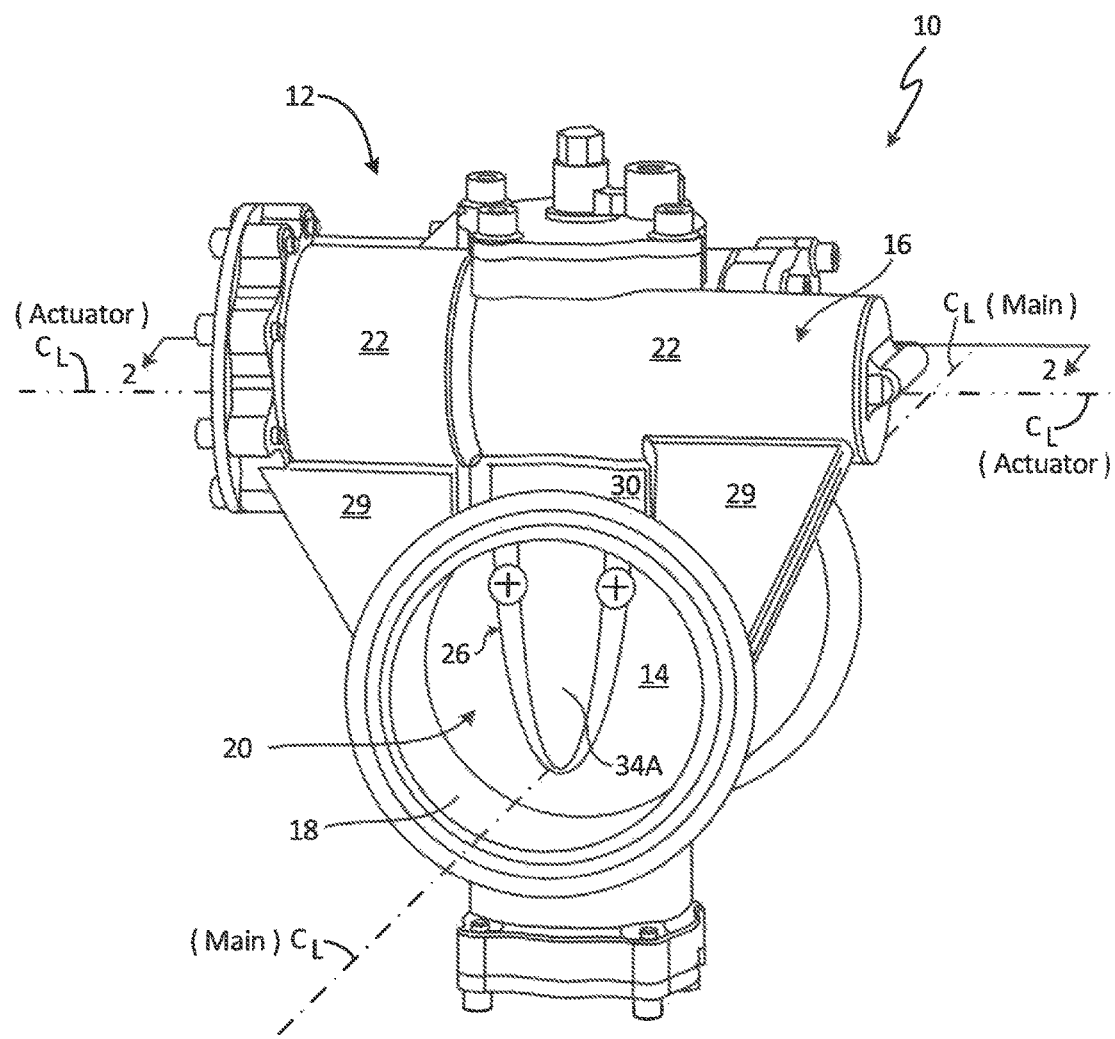
FIG. 1 is a perspective view of one exemplary embodiment of a butterfly valve.
Figure 2:
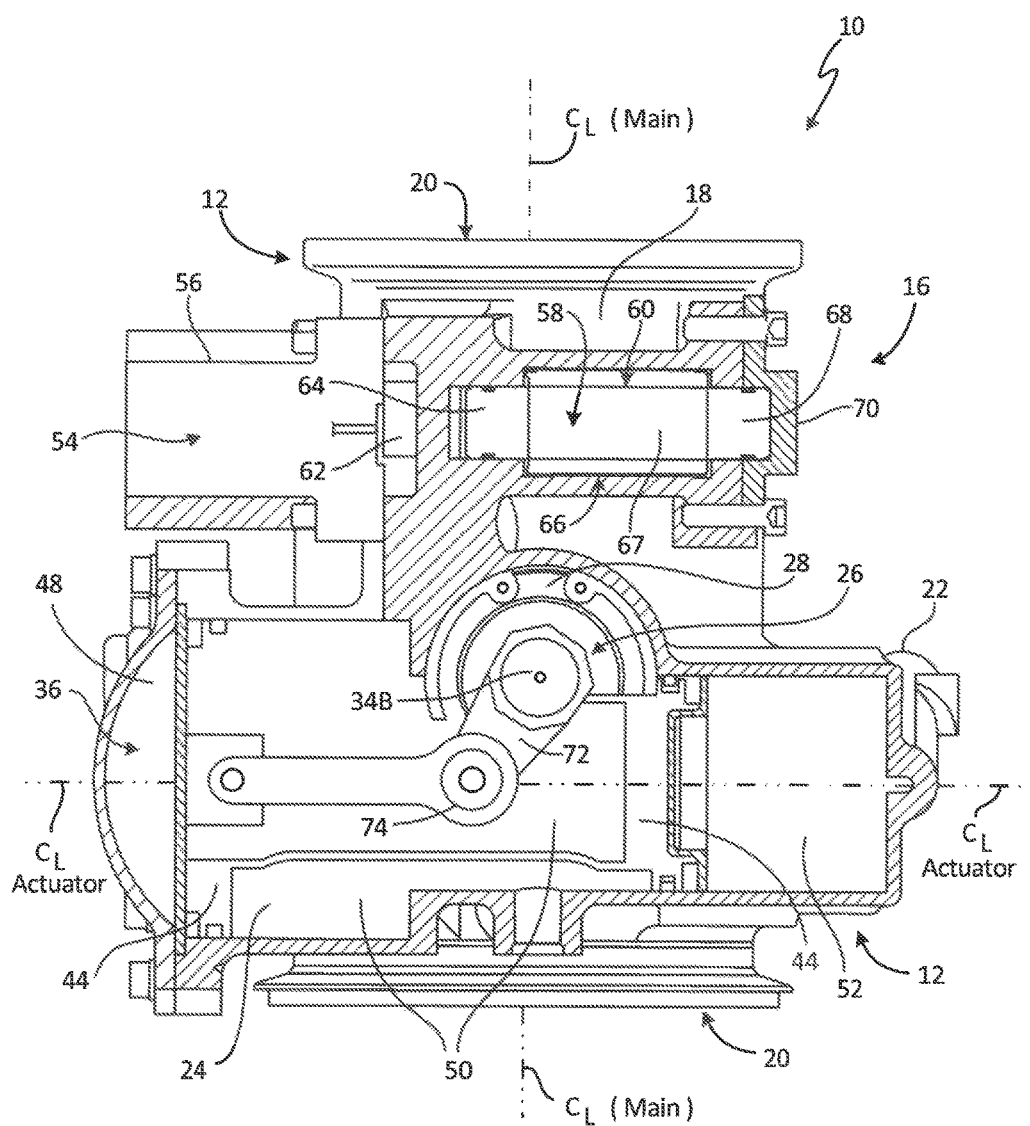
FIG. 2 is a cutaway, downward-facing view of an actuator portion of the valve shown in FIG. 1.

FIG. 1 is a perspective view of valve 10, and FIG. 2 is a sectional view taken through line 2-2 of FIG. 1. FIGS. 1 and 2 show one non-limiting illustrative embodiment of an arrangement of an actuator assembly 16 suitable for use in a butterfly valve. Valve 10 generally includes valve housing 12, flow control member 14, and actuator assembly 16. Valve housing 12 can include several walls to define various passages for the operable elements of valve 10. In this non-limiting illustrative example, housing 12 includes at least one first wall 18 defining a valve main body with main fluid passage 20, as well as one or more second walls 22 defining actuator chamber 24 (best seen in FIG. 2).

Shaft 26 extends through shaft passage 28, which in this instance can be formed through at least one housing wall (e.g., wall 30). As best illustrated in FIG. 2, shaft 26 can be inserted through an opening in wall 30, which separates main fluid passage 20 and actuator chamber 24. Opening 28 defines a portion of shaft passage 26, and can be in communication with one or more portions of actuator chamber 24. Depending on the particular construction of valve 10, wall 30 can include one or both of a first wall 18 and a second wall 22. Wall 30 may also be a common wall defining a portion of both main fluid passage 20 and actuator chamber 24.

Actuator assembly 16 can include one or more actuator units disposed in actuator chamber 24. In the example shown, these are disposed transverse to valve centerline $C_L$(main). Here, valve centerline $C_L$(main) is defined parallel to a longitudinal axis of main passage 20. In FIGS. 1-2, optional support brackets 29 connect at least one first wall 18 to at least one of the plurality of second walls 22. These support brackets 29, which may be integral to housing 12, support actuator chamber 24 and actuator assembly 16 above main fluid passage 20. As seen in FIG. 2 (and in more detail in FIG. 3), as part of actuator assembly 16, one or more actuator units 36 can be disposed in actuator chamber 24 atop main fluid passage 20.

Both actuator chamber 24 and actuator unit(s) 36 are supported transversely above main fluid passage 20 such that actuator centerline $C_L$(actuator) is transverse or perpendicular to valve centerline $C_L$(main), which is defined along a longitudinal axis of main fluid passage 20. In certain embodiments, to facilitate transverse positioning of actuator assembly 16, (e.g., the centerline of the actuator and/or piston) relative to the valve centerline, one or more of the shaft, crank and linkage can be placed in the intermediate portion of actuator chamber 24.

In alternative embodiments (not shown), the actuator centerline is perpendicular only relative to the shaft, but is generally parallel or at least coplanar with the valve centerline. Because the shaft and disc are canted relative to the flow passage, to achieve the torque required to rotate a disc, such conventional arrangements can include a cantilevered actuator, but may not be suitable for use in certain high vibration environments such as in some gas turbine engines.

Flow control member 14 can be adapted to rotate in main fluid passage 20 via rotation of shaft 26. Though shown in a closed position, rotational position of flow control member 14 results in an opening for fluid to pass through main fluid passage 20. In the illustrative example of a butterfly valve, rotational position of flow control member/butterfly disc 14 defines the size of a fluid opening about perimeter 32 of flow control member 14. The rotational position and speed of flow control member 14 (via shaft 26) can be calibrated in conjunction with actuator assembly 16 to control an effective size of the opening adjacent perimeter 32.

Flow control member 14 (e.g., a butterfly disc) can be mounted to a first longitudinal end 34A of shaft 26, and which extends into main fluid passage 20, while second longitudinal end 34B of shaft 26 is connected to actuator assembly 16. To drive rotation of shaft 26 (and flow control member 14), actuator assembly 16 can include at least one actuator unit 36 to effect rotation of flow control member 14 via shaft second longitudinal end 34B. In this way, rotation of flow control member 14 can control fluid flow through main fluid passage 20.

In certain embodiments, actuator unit 36 can be a linear actuator with at least one piston unit 44. Here, actuator chamber 24 is divided into servo portion 48, intermediate portion 50, and supply portion 52, each of which retain a corresponding portion of piston unit 44. As part of actuator unit 36, piston unit 44 can be driven in either direction by torque motor 54, which is in communication with servo portion 48 of actuator chamber 24. Torque motor 54 can in turn be disposed parallel and immediately adjacent to actuator unit 36, supported at motor portion or motor mount 56 of actuator chamber 24. Motor mount 56 can additionally or alternatively be provided in a separate motor chamber. Replaceable filter assembly 58 can be provided in filter bore 60 to ensure particulates or contaminants do not reach actuator chamber 24. Filter assembly 58 can be packaged tightly with other actuator components, close to the valve center of gravity to reduce effects of external vibration on the valve.

Filter bore 60 is disposed in communication with flow passages (not visible in FIG. 2) between main fluid passage 20 and actuator chamber 24. Filter bore 60, adapted to receive filter assembly 58, can include for example, wall(s) defining inlet bore portion 62 for receiving and retaining an inlet side 64 of filter assembly 58. In certain embodiments, inlet bore portion provides or completes fluid communication between main fluid passage 20 and an axial inlet port 78 (shown in FIG. 3) on inlet side 62 of filter assembly 58.

Figure 4:
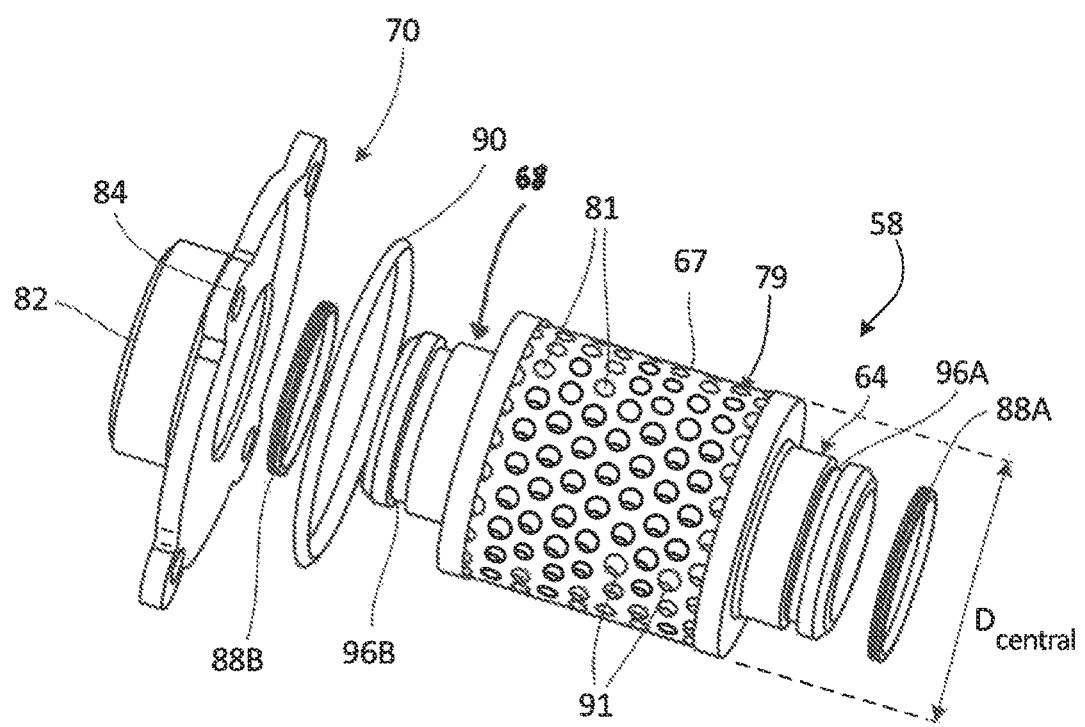
FIG. 4 shows an exploded view of the filter assembly and seals from FIG. 3.

Main filter bore portion 66 can be disposed outward of inlet bore portion 62 for receiving and retaining cylindrical wall 80 of filter body 67 (best seen in FIG. 4). Main filter bore portion 66 can have a port or other opening (not visible in FIG. 2) to provide communication between at least one outlet port 65 in a main bore wall 69.

Figure 3:
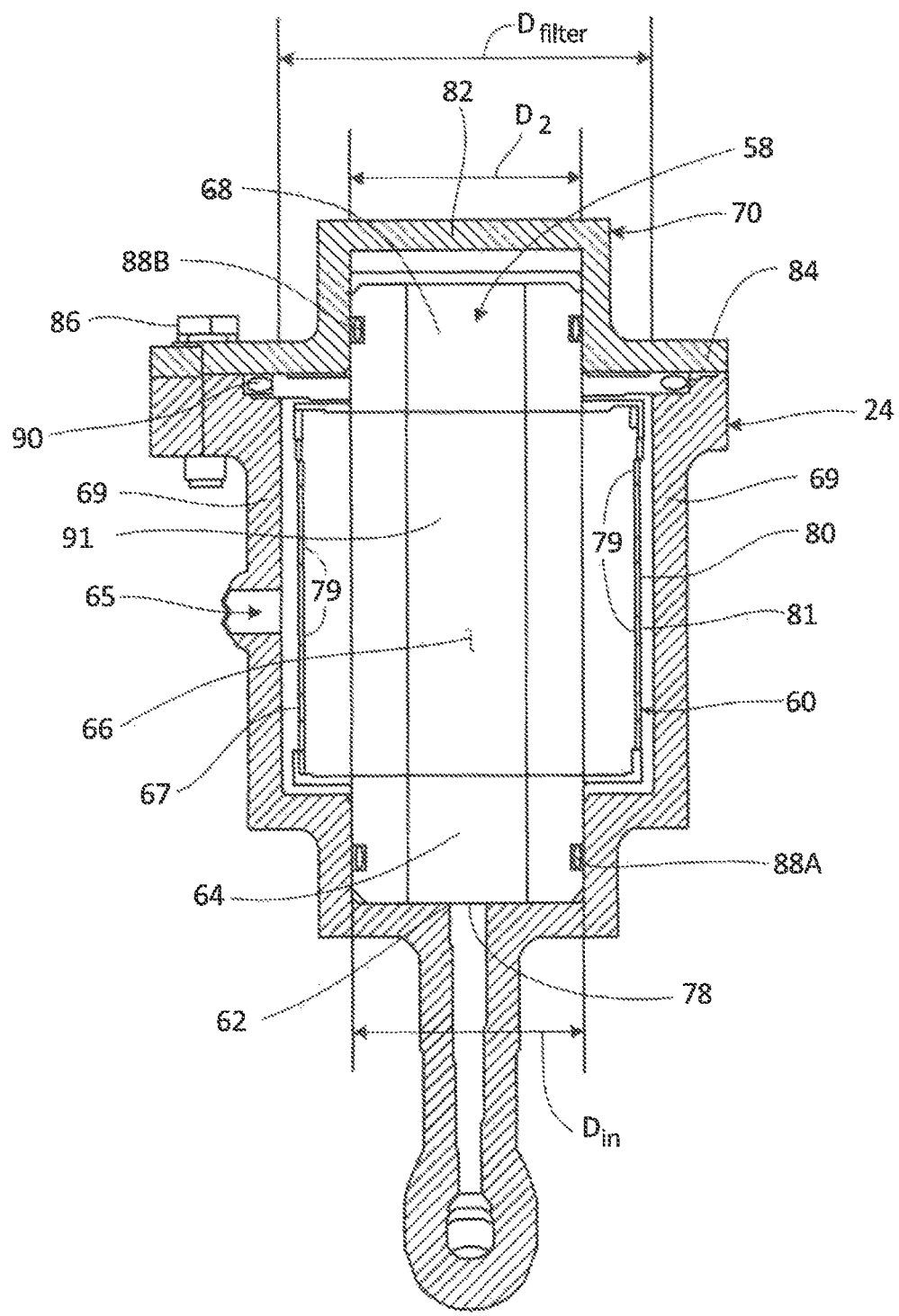
FIG. 3 is a sectional view showing detailed fit of a filter assembly into a bore.

As better seen in FIGS. 3 and 4, filter assembly 58 can also include closed outer side 68 having a second diameter $D_2$, such that filter body 67 is disposed between inlet side 64 and outer side 68 of filter assembly 58. Also better seen in FIGS. 3 and 4, filter body 67 has a filter diameter $D_{filter}$ larger than both $D_{in}$ and $D_2$ so as to increase the available filtering and airflow volume. Filter body 67 includes a cylindrical wall 80 retaining filter media (not visible in FIG. 2), and a plurality of perforations (shown in FIGS. 3 and 4) formed through the cylindrical wall 80 to serve as at least one exit for filter assembly 58.

Filter cover 70 secures filter assembly 58 to actuator assembly 16. As best seen in FIGS. 3 and 4, cover 70 includes a central recessed portion for receiving and retaining outer side 68 of filter assembly 58, and a flange circumscribing the central recessed portion and fastened to actuator assembly 16. Outer side 68 and cover 70 extend outward beyond one or more walls 22 defining actuator assembly 16.

In certain embodiments, actuator unit 36 also includes linkage 74 and crank 72 connecting actuator unit 36 (e.g., piston unit 44) to shaft second end 34B. Linkage 74 and crank 72 can be adapted to translate motion of the actuator unit. To further facilitate operation of valve 10, at least one of the plurality of second walls 22 defining actuator chamber 24 includes at least one vent (not shown) for equalizing pressure in intermediate portion 50, which is also in communication with shaft passage 28. Intermediate portion 50 can be vented to ambient, downstream pressure, or another suitable region.

FIG. 3 is a magnified view of a portion of FIG. 2, with an example embodiment of replaceable filter assembly 58 disposed in and sized to seal within filter bore 60 having a first diameter $D_{in}$. Outer/second side 68 of filter assembly 58, longitudinally opposed to inlet side 64 and sized to seal within a second bore and/or a recessed portion of filter cover 70, has a second diameter $D_2$, similar or identical to first diameter $D_{in}$. Inlet side 64 can have axial inlet port 78 Main filter body or central portion 67 disposed between inlet side 62 and outer/second side 68 has cylindrical wall 80 defining a filter diameter $D_{central}$ larger than $D_{in}$ and/or $D_2$.

With a diameter $D_{central}$ larger than both $D_{in}$ and $D_2$, outer/second side 68 is closed to increase residence time in filter body 67, before filtered air proceeds to exit 79 (e.g., one or more perforations 81, best seen in FIG. 4) in cylindrical wall 80. Filter cover 70 secures the filter assembly 58 to actuator assembly 16 and can include central recessed portion 82 for receiving, retaining, and enclosing outer/second side 68 of filter assembly 58. Flange 84 at least partially circumscribes central recessed portion 82 and is used to fasten cover 70 (e.g., via one or more fasteners 86) to at least one of the walls defining actuator assembly 16 (e.g., second walls 22 in FIG. 1).

To further retain flow along the intended path, and to prevent leakage and lifting of the filter assembly, several seals can be incorporated into this structure. First annular seal 88A can be formed between inlet side 64 and inlet bore portion 62. Second annular seal 88B can be formed between closed outer side 68 of filter assembly 58, and a surface of recessed portion 82 of filter cover 70. Third annular seal 90, having larger diameter than first and second seals 88A, 88B, can seal a wall of actuator assembly and an inward surface of cover flange 84.

In combination, these elements utilize both finer mesh filtration and increased filter contact area (approximately 30× higher than mesh or screen filters) for improved filtration capacity and increased durability of the valve. It allows higher mesh filters such as stainless steel wire mesh, sintered steel, spun glass and/or synthetic fibers, any of which can be either treated or untreated. Filter body 66 accommodates a larger diameter pleated filter media 91 (best seen in FIG. 3), substantially increasing filter contact area as compared to conventional metal mesh or screen filters. Air flows into axial inlet port 78 on inlet side 64, which faces the interior of actuator assembly 16. It then passes through pleated filter media 91 toward closed outer side 68. But as seen in FIG. 3, most air is prevented from escaping at outer side 68 by cover 70 and seals 88A, 88B, 90. Rather, filtered air escapes filter through holes or other perforations 81 formed in cylindrical wall 80 of filter body 67. First, second, and third seals 88A, 88B, 90 can be incorporated to prevent most air from escaping and lifting of the filter assembly 58, by which unfiltered air, and in turn particulates and contaminants, could bypass the filter entirely.

FIG. 4 shows more detail of replaceable filter assembly 58 in an exploded configuration. As noted with respect to FIG. 3, inlet side 64 has a first diameter $D_{in}$, and outer side 68 has a second diameter $D_2$. $D_{in}$ and $D_2$ can be similar or identical diameters. In certain embodiments, $D_{in}$ and $D_2$ are each about 0.52 inches (1.3 cm), while $D_{filter}$ is about 0.99 inches (2.5 cm). Filter body 67, has a filter diameter $D_{filter}$ larger than both $D_{in}$ and $D_2$. In certain embodiments, $D_{filter}$ is between 1.6× and 3.4× of $D_{in}$ and/or $D_2$.

Referring to both FIGS. 3 and 4, to form first annular seal 88A, inlet elastomeric ring seal 88A can be retained in first recess 96A formed around inlet side 64 of filter assembly 58. For second annular seal 88B, outlet elastomeric ring seal 88B can be retained in second recess 96B formed around outer side 68 of filter assembly 58. Third annular seal 90 can be formed via cover elastomeric ring seal 90 retained between the actuator assembly 16 and the cover flange 84. One or more or ring seals 88A, 88B, 90 can be elastomeric O-rings capable of withstanding the intended or expected environments. For example, in aircraft applications, the valve may be exposed to different levels of pollution, heat, and particulates depending on where in the world it is expected to operate, and thus ring seals 88A, 88B, 90 may need to have some degree of chemical resistance to maintain sealing throughout the expected life of the valve.

In total, the increased diameter results in higher effective capacity of the filter media, and improves the durability of the component by lasting longer before clogging. The shape and seals work to allow for use of a lower micron rating filter media to better protect downstream components, and add useful life to the valve assembly. This configuration also eliminates spring-loading so that the filter does not lift or otherwise provide a flowpath for contaminants if and when the filter does eventually clog. And due to the sealing configuration, there is no axial plugging of the airflow through the filter upon clogging, unlike other arrangements such as meshes or screens.

Discussion of Possible Embodiments

One example embodiment of a valve includes a valve housing including one or more first walls defining at least a main fluid passage with a valve centerline parallel to a longitudinal axis of the main fluid passage, and one or more second walls defining an actuator chamber above the main fluid passage. A shaft extends along a shaft passage connecting the actuator chamber and the main fluid passage. A flow control member is mounted to a first longitudinal end of the shaft extending into the main fluid passage, the flow control member rotatable in the main fluid passage. An actuator assembly is disposed in the actuator chamber, and is adapted to rotate a second end of the shaft to effect rotation of the flow control member in the main fluid passage. The actuator assembly includes at least one actuator unit arranged in the actuator chamber. A filter bore is adapted to receive a filter assembly, between the main fluid passage and the actuator chamber. The filter bore includes an inlet bore portion for receiving and retaining an inlet side of the filter assembly having an axial inlet and first diameter $D_{in}$. The inlet bore portion provides communication between the main fluid passage and an axial inlet port on the inlet side of the filter assembly. A main filter bore portion having a filter diameter $D_{filter}$ larger than $D_{in}$ is disposed outward of the inlet bore portion for receiving and retaining a cylindrical wall of a filter body. The main filter bore portion provides communication between at least one outlet port on a main bore wall and the actuator chamber.

An embodiment of a valve assembly according to an exemplary embodiment of this disclosure, among other possible things, includes a valve housing including one or more first walls defining at least a main fluid passage with a valve centerline parallel to a longitudinal axis of the main fluid passage, and one or more second walls defining an actuator chamber above the main fluid passage; a shaft extending along a shaft passage connecting the actuator chamber and the main fluid passage; a flow control member mounted to a first longitudinal end of the shaft extending into the main fluid passage, the flow control member rotatable in the main fluid passage; an actuator assembly disposed in the actuator chamber, the actuator assembly adapted to rotate a second end of the shaft to effect rotation of the flow control member in the main fluid passage, the actuator assembly including at least one actuator unit arranged in the actuator chamber; and a filter bore adapted to receive a filter assembly, between the main fluid passage and the actuator chamber, the filter bore comprising: an inlet bore portion for receiving and retaining an inlet side of the filter assembly having an axial inlet and first diameter $D_{in}$, the inlet bore portion providing communication between the main fluid passage and an axial inlet port on the inlet side of the filter assembly; and a main filter bore portion having a filter diameter $D_{filter}$ larger than $D_{in}$ disposed outward of the inlet bore portion for receiving and retaining a cylindrical wall of a filter body, the main filter bore portion providing communication between at least one outlet port on a main bore wall and the actuator chamber.

The assembly of the preceding paragraph can optionally include, additionally and/or alternatively, any one or more of the following features, configurations and/or additional components:

A further embodiment of the foregoing valve, and further comprising: a filter assembly disposed in the filter bore, the filter assembly comprising: an inlet side having an axial inlet port and the first diameter $D_{in}$; a closed outer side having a second diameter $D_2$; and a filter body disposed between the inlet side and the outer side having a filter diameter $D_{filter}$ larger than both $D_{in}$ and $D_2$, the filter body including a cylindrical wall retaining a pleated filter media, and a plurality of perforations formed through the cylindrical wall to serve as the at least one exit for the filter.

A further embodiment of any of the foregoing valves, wherein $D_{in}$ is equal to $D_2$.

A further embodiment of any of the foregoing valves, wherein $D_{filter}$ is between 1.6× and 3.4× of $D_{in}$ or $D_2$.

A further embodiment of any of the foregoing valves, wherein the filter assembly further comprises: a cover securing the filter assembly to the actuator assembly, the cover including a central recessed portion for receiving and retaining the outer portion of the filter assembly, and a flange circumscribing the central recessed portion and fastened to one of the second walls defining the actuator assembly.

A further embodiment of any of the foregoing valves, wherein the filter assembly further comprises: an inlet ring seal retained in a first recess formed around the inlet side of the filter assembly, forming a first annular seal between the inlet side and the inlet bore; an outer ring seal retained in a second recess formed around the outer portion of the filter assembly, forming a second annular seal between the outer portion and the cover; and a cover ring seal retained around an outer surface of the filter body, forming a third annular seal between a wall of the actuator assembly and an inward surface of the cover.

A further embodiment of any of the foregoing valves, wherein the pleated filter media comprises stainless steel wire mesh, sintered steel, spun glass fiber, at least one type of synthetic fiber, or combinations thereof.

A further embodiment of any of the foregoing valves, wherein the actuator chamber includes a servo portion, an intermediate portion, and a supply portion; and the actuator unit includes a linear actuator with piston disposed in the actuator chamber, the piston drivable along the actuator centerline so that linear motion of the piston is along the actuator centerline.

A further embodiment of any of the foregoing valves, wherein the actuator centerline is transverse to the valve centerline.

A further embodiment of any of the foregoing valves, further comprising: a support bracket connecting at least one first wall to at least one second wall for supporting the actuator chamber and actuator unit transverse to the valve centerline and the longitudinal axis of the main fluid passage.

A further embodiment of any of the foregoing valves, wherein the actuator unit includes a torque motor servo valve in communication with the servo portion of the actuator chamber, the torque motor attached to a mount disposed in a motor chamber.

An example embodiment of a filter for a butterfly valve includes an inlet side having an axial inlet port and sized to seal within a first bore having a first diameter $D_{in}$, a second side sized to seal within a second bore having a second diameter $D_2$, and a central portion disposed between the inlet side and the second side. The central portion has a filter diameter $D_{central}$ larger than both $D_{in}$ and $D_2$, and includes a cylindrical wall retaining a pleated filter media. At least one perforation is formed through the cylindrical wall to allow fluid flow therethrough.

An embodiment of a filter assembly according to an exemplary embodiment of this disclosure, among other possible things, includes an inlet side having an axial inlet port and sized to seal within a first bore having a first diameter $D_{in}$; a second side sized to seal within a second bore having a second diameter $D_2$; and a central portion disposed between the inlet side and the second side having a central diameter $D_{central}$ wherein $D_{central}$ is greater than both $D_{in}$ and $D_2$, the central portion including a cylindrical wall retaining a pleated filter media, and at least one perforation formed through the cylindrical wall to allow fluid flow therethrough.

The filter of the preceding paragraph can optionally include, additionally and/or alternatively, any one or more of the following features, configurations and/or additional components:

A further embodiment of the foregoing filter, wherein $D_{in}$ is equal to $D_2$ and the filter assembly is longitudinally symmetrical.

A further embodiment of any of the foregoing filters, wherein $D_{central}$ is between 1.6× and 3.4× of $D_{in}$ or $D_2$.

A further embodiment of any of the foregoing filters, wherein the filter assembly further comprises: a cover for securing the filter assembly to an actuator assembly, the cover including a central recessed portion for receiving and retaining the outer portion of the filter assembly, and a flange circumscribing the central recessed portion for fastening the cover to at least one wall of the actuator assembly.

A further embodiment of any of the foregoing filters, wherein the filter assembly further comprises: a first recess formed around the inlet side of the filter assembly, for retaining an inlet seal ring annularly between the inlet side and an inlet portion of a filter bore disposed in the actuator assembly; a second recess formed around the outer portion of the filter assembly, for retaining an outer seal ring annularly between the outer portion and the cover; and a cover ring seal disposed around an outer axial surface of the filter body, for forming an annular seal between a wall of the actuator assembly and an inward surface of the cover.

A further embodiment of any of the foregoing filters, wherein the pleated filter media comprises stainless steel wire mesh, sintered steel, spun glass fiber, at least one type of synthetic fiber, or combinations thereof.

An embodiment of a method for maintaining a pneumatic valve includes removing a filter assembly from a filter bore. The filter bore includes an inlet bore portion for receiving and retaining an inlet side of the filter assembly having an axial inlet and first diameter $D_{in}$. The inlet bore portion provides communication between the main fluid passage and an axial inlet port on the inlet side of the filter assembly. A main filter bore portion having a filter diameter $D_{filter}$ larger than $D_{in}$ is disposed outward of the inlet bore portion for receiving and retaining a cylindrical wall of a filter body. The main filter bore portion provides communication between at least one outlet port on a main bore wall and the actuator chamber. The method also includes inserting a replacement filter assembly into the filter bore, and the replacement filter assembly includes an inlet side having an axial inlet port and sized to seal within a first bore having a first diameter $D_{in}$, a second side sized to seal within a second bore having a second diameter $D_2$; and a central portion disposed between the inlet side and the second side having a central diameter $D_{central}$ wherein $D_{central}$ is greater than both $D_{in}$ and $D_2$. The central portion includes a cylindrical wall retaining a pleated filter media, and at least one perforation is formed through the cylindrical wall to allow fluid flow therethrough.

An embodiment of a method for maintaining a pneumatic valve according to an exemplary embodiment of this disclosure, among other possible things, includes removing a filter assembly from a filter bore comprising: an inlet bore portion for receiving and retaining an inlet side of the filter assembly having an axial inlet and first diameter $D_{in}$, the inlet bore portion providing communication between the main fluid passage and an axial inlet port on the inlet side of the filter assembly; and a main filter bore portion having a filter diameter $D_{filter}$ larger than $D_{in}$ disposed outward of the inlet bore portion for receiving and retaining a cylindrical wall of a filter body, the main filter bore portion providing communication between at least one outlet port on a main bore wall and the actuator chamber; and inserting a replacement filter assembly into the filter bore, the replacement filter assembly comprising: an inlet side having an axial inlet port and sized to seal within a first bore having a first diameter $D_{in}$, a second side sized to seal within a second bore having a second diameter $D_2$; and a central portion disposed between the inlet side and the second side having a central diameter $D_{central}$ wherein $D_{central}$ is greater than both $D_{in}$ and $D_2$. The central portion includes a cylindrical wall retaining a pleated filter media, and at least one perforation is formed through the cylindrical wall to allow fluid flow therethrough.

The method of the preceding paragraph can optionally include, additionally and/or alternatively, any one or more of the following features, configurations and/or additional components:

A further embodiment of the foregoing method, wherein $D_{in}$ is equal to $D_2$, and $D_{filter}$ is between 1.6× and 3.4× of $D_{in}$ or $D_2$.

A further embodiment of any of the foregoing methods, wherein the filter assembly further comprises: a cover for securing the filter assembly to an actuator assembly, the cover including a central recessed portion for receiving and retaining the outer portion of the filter assembly, and a flange circumscribing the central recessed portion for fastening the cover to at least one wall of an actuator assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve comprising:
   a valve housing including one or more first walls defining at least a main air passage with a valve centerline parallel to a longitudinal axis of the main fluid passage, and one or more second walls defining an actuator chamber above the main air passage;
   a shaft extending along a shaft passage connecting the actuator chamber and the main air passage;
   a flow control member mounted to a first longitudinal end of the shaft extending into the main air passage, the flow control member rotatable in the main air passage;
   an actuator assembly disposed in the actuator chamber, the actuator assembly adapted to rotate a second end of the shaft to effect rotation of the flow control member in the main air passage, the actuator assembly including at least one actuator unit arranged in the actuator chamber;
   a filter bore adapted to receive a filter assembly, between the main air passage and the actuator chamber, the filter assembly comprising:
      an inlet side having an axial inlet port and a first diameter for sealing against an inlet portion of the filter bore;
      a closed outer side having a second diameter; and
      a filter body disposed between the inlet side and the outer side, the filter body including a cylindrical wall retaining a pleated filter media, and a plurality of perforations formed through the cylindrical wall to serve as at least one exit for the filter;
   the filter bore comprising:
      an inlet bore portion for receiving and retaining the inlet side of the filter assembly the inlet bore portion having an axial air inlet and first diameter $D_{in}$ and providing communication between the main air passage and the axial inlet port on the inlet side of the filter assembly; and
      a main filter bore portion having a filter diameter $D_{filter}$ larger than $D_{in}$, disposed outward of the inlet bore portion, the main filter bore portion providing communication between at least one outlet port on a main bore wall and the actuator chamber; and
   a cover securing the filter assembly to the actuator assembly within the filter bore, the cover including a central recessed portion with a second diameter $D_2$ for receiving and retaining the closed outer side of the filter assembly, and a flange circumscribing the central recessed portion and fastened to one of the second walls defining the actuator assembly;
   wherein the filter body has a filter diameter $D_{central}$ larger than both $D_{in}$ and $D_2$.

2. The valve of claim 1, wherein $D_{in}$ is equal to $D_2$.

3. The valve of claim 1, wherein $D_{filter}$ is between 1.6× and 3.4× of $D_{in}$ or $D_2$.

4. The valve of claim 1, wherein the filter assembly further comprises:
   an inlet ring seal retained in a first recess formed around the inlet side of the filter assembly, forming a first annular seal between the inlet side and the inlet bore;
   an outer ring seal retained in a second recess formed around the outer portion of the filter assembly, forming a second annular seal between the outer portion and the cover; and
   a cover ring seal retained around an outer surface of the filter body, forming a third annular seal between a wall of the actuator assembly and an inward surface of the cover.

5. The valve of claim 1, wherein the pleated filter media comprises stainless steel wire mesh, sintered steel, spun glass fiber, at least one type of synthetic fiber, or combinations thereof.

6. The valve of claim 1, wherein the actuator chamber includes a servo portion, an intermediate portion, and a supply portion; and the actuator unit includes a linear actuator with piston disposed in the actuator chamber, the piston drivable along the actuator centerline so that linear motion of the piston is along the actuator centerline.

7. The valve of claim 6, wherein the actuator unit includes a torque motor servo valve in communication with the servo portion of the actuator chamber, the torque motor attached to a mount disposed in a motor chamber.

8. The valve of claim 1, wherein the actuator centerline is transverse to the valve centerline.

9. The valve of claim 8, further comprising:
a support bracket connecting at least one first wall to at least one second wall for supporting the actuator chamber and actuator unit transverse to the valve centerline and the longitudinal axis of the main fluid passage.

10. A filter assembly for a pneumatic valve, comprising:
an air inlet side having an axial inlet port and sized to seal within a first bore having a first diameter $D_{in}$;
a closed second side sized to seal within a second bore having a second diameter $D_2$; and
a central filter body portion disposed between the air inlet side and the closed second side having a central diameter $D_{central}$ wherein $D_{central}$ is greater than both $D_{in}$ and $D_2$, the central portion including a cylindrical wall retaining a pleated filter media, and at least one perforation formed through the cylindrical wall to allow air flow therethrough to serve as an exit for the air from the filter assembly.

11. The filter assembly of claim 10, wherein $D_{in}$ is equal to $D_2$ and the filter assembly is longitudinally symmetrical.

12. The filter assembly of claim 10, wherein $D_{central}$ is between 1.6× and 3.4× of $D_{in}$ or $D_2$.

13. The filter assembly of claim 10, further comprising:
a cover for securing the filter assembly to an actuator assembly, the cover including a central recessed portion, having the second diameter $D_2$, for receiving and retaining the outer portion closed second side of the filter assembly, and a flange circumscribing the central recessed portion for fastening the cover to at least one wall of an actuator assembly of the pneumatic valve.

14. The filter assembly of claim 13, further comprising:
a first recess formed around the inlet side of the filter assembly, for retaining an inlet seal ring annularly between the inlet side and an inlet portion of a filter bore disposed in the actuator assembly;
a second recess formed around the outer portion of the filter assembly, for retaining an outer seal ring annularly between the outer portion and the cover; and
a cover ring seal disposed around an outer axial surface of the filter body, for forming an annular seal between a wall of the actuator assembly and an inward surface of the cover.

15. The filter assembly of claim 10, wherein the pleated filter media comprises stainless steel wire mesh, sintered steel, spun glass fiber, at least one type of synthetic fiber, or combinations thereof.

16. A method for maintaining a pneumatic valve, the method comprising:
removing a cover securing a filter assembly to an actuator assembly, the cover including a central recessed portion for receiving and retaining the outer portion of the filter assembly, and a flange circumscribing the central recessed portion and fastened to one of the second walls defining the actuator assembly;
removing a filter assembly from a filter bore comprising:
an inlet bore portion for receiving and retaining an inlet side of the filter assembly having an axial inlet and first diameter $D_{in}$, the inlet bore portion providing communication between the main fluid passage and an axial inlet port on the inlet side of the filter assembly; and
a main filter bore portion having a filter diameter $D_{filter}$ larger than $D_{in}$, disposed outward of the inlet bore portion for receiving and retaining a cylindrical wall or central portion of a filter body, the main filter bore portion providing communication between at least one outlet port on a main bore wall and the actuator chamber; and
inserting a replacement filter assembly into the filter bore, the replacement filter assembly comprising:
an inlet side having an axial inlet port and sized to seal within a first bore having a first diameter $D_{in}$;
a second side sized to seal within a second bore having a second diameter $D_2$; and
a central portion disposed between the inlet side and the second side having a central diameter $D_{central}$ wherein $D_{central}$ is greater than both $D_{in}$ and $D_2$, the central portion including a cylindrical wall retaining a pleated filter media, and at least one perforation formed through the cylindrical wall to allow fluid flow therethrough.

17. The method of claim 16, wherein $D_{in}$ is equal to $D_2$, and $D_{filter}$ is between 1.6× and 3.4× of $D_{in}$ or $D_2$.

* * * * *